United States Patent Office 3,697,473
Patented Oct. 10, 1972

3,697,473
COMPOSITION CURABLE THROUGH Si-H AND Si-CH EQUALS CH₂ WITH IMPROVED PROPERTIES
Keith E. Polmanteer, David N. Willing, and Thomas D. Talcott, Midland, Mich., assignors to Dow Corning Corporation, Midland, Mich.
No Drawing. Continuation-in-part of application Ser. No. 852,103, Aug. 21, 1969. This application Jan. 4, 1971, Ser. No. 103,830
Int. Cl. C08g 51/04
U.S. Cl. 260—37 SB                    20 Claims

ABSTRACT OF THE DISCLOSURE

A composition contains a polydiorganosiloxane having two vinyl radicals, a mixture of silicon compounds having silicon-bonded hydrogen atoms where one organosiloxane compound has two silicon-bonded hydrogen atoms and the other organosiloxane compound has three to ten silicon bonded hydrogen atoms. The composition is cured by a platinum catalyst. The cured composition has elastomeric properties.

This application is a continuation-in-part of application Ser. No. 852,103, filed Aug. 21, 1969, now abandoned.

This invention relates to a siloxane composition curable through Si-H and Si-CH=CH₂ to an elastomeric product.

Many articles of commerce based on organosilicon compounds are of the type that can be easily formed to a desired shape or applied to a desired area, after which the easily worked material is then cured to retain its desired configuration. For example, polyorganosiloxane elastomers are normally supplied as formable materials ranging from thin pastes to stiff plastic dough-like materials. These materials are shaped by processes such as molding and extruding, after which the article is converted to the rubbery state by curing, a process often called vulcanization when applied to an elastomer. The article then retains its desired shape, or if deformed, will seek to return to its vulcanized, or cured configuration.

The curing methods employed for organosilicon compositions can be placed into two classes. The first are those that occur spontaneously at room temperature, exemplified by the curing systems such as described in U.S. Pats. 2,833,742, 2,843,555, 2,902,467, 2,934,519 and 2,999,077. The second are those that require heat to activate the curing reaction, such as organic peroxides, and the various sulfur-type cures more commonly used in connection with organic rubber.

The organosilicon compositions which cure spontaneously at room temperature are, for the most part, low in viscosity so that they can be manually placed in the desired position for cure with a minimum of equipment. The room temperature vulcanizable compositions do not need to be heated for cure and thus can be used in places where controlled heating equipment is not practical. Consequently, the room temperature vulcanizable compositions are highly desirable materials. Since the room temperature vulcanizable compositions are usually low in viscosity, the molecular weights of the base polymers are low. It is generally recognized in the silicone rubber art that low molecular weight base polymers provide overall lower physical properties compared with the higher molecular weight base polymers. Thus, the low viscosity room temperature vulcanizable silicone rubbers generally have lower physical properties than the peroxide cured silicone rubbers prepared from high molecular weight gums. For this reason, it has been difficult to achieve a curable silicone rubber composition which would be low in viscosity for easy handling and which would cure to a silicone rubber with physical properties comparable to the peroxide cured silicone rubbers.

The present invention overcomes this problem by providing a composition which uses low molecular weight base polymers and cures to a material with improved physical properties. This object and others will become apparent from the following detailed description of the invention.

This invention relates to a composition consisting essentially of (A) a polydiorganosiloxane having two vinyl radicals per molecule, no silicon atom having more than one vinyl radical bonded thereto, the remaining organic radicals being selected from the group consisting of methyl, ethyl, phenyl and 3,3,3-trifluoropropyl radicals, at least 50 percent of the organic radicals being methyl radicals, said polydiorganosiloxane molecules being terminated by triorganosiloxy groups, and said polydiorganosiloxane having a viscosity of from 100 to 10,000 inclusive centipoise at 25° C., (B) a mixture of silicon containing compounds having silicon-bonded hydrogen atoms, there being present of from 0.75 to 1.50 silicon-bonded hydrogen atoms per vinyl radical of (A), said mixture (B) consisting essentially of (1) an organosiloxane compound containing two silicon-bonded hydrogen atoms per molecule and the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, said organosiloxane compound (1) having no more than 500 silicon atoms per molecule, and (2) an organosiloxane compound containing from 3 to 10 inclusive silicon-bonded hydrogen atoms per molecule and the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, said organosiloxane compound (2) having no more than 75 silicon atoms per molecule, said mixture (B) being such that at least 10 percent of the silicon-bonded hydrogen atoms are derived from (1) and at least 10 percent of the silicon-bonded hydrogen atoms are derived from (2), (1) and (2) composing 100 weight percent of mixture (B).

The polydiorganosiloxane (A) has two vinyl radicals per molecule, only one vinyl radical is bonded to any one silicon atom, and the remaining organic radicals can be methyl, ethyl, phenyl or 3,3,3-trifluoropropyl radicals where at least 50 percent are methyl radicals. The polydiorganosiloxane (A) is terminated by triorganosiloxy groups. The polydiorganosiloxane has a viscosity of 100 to 10,000 inclusive cp. at 25° C., preferably 1000 to 5000 cp. at 25° C.

The polydiorganosiloxane (A) can have any combination of the following diorganosiloxane units as long as the molecules have two vinyl radicals, at least 50 percent of the organic radicals are methyl radicals and the viscosity is 100 to 10,000 cp. at 25° C. Such diorganosiloxane units include dimethylsiloxane,
diethylsiloxane,
diphenylsiloxane,
methylphenylsiloxane,
ethylmethylsiloxane,
methylvinylsiloxane,
3,3,3-trifluoropropylmethylsiloxane,
ethylvinylsiloxane,
phenylvinylsiloxane,
3,3,3-trifluoropropylvinylsiloxane,
ethylphenylsiloxane,
3,3,3-trifluoropropylphenylsiloxane and
3,3,3-trifluoropropylethylsiloxane.

The terminating triorganosiloxy groups can be illustrated by trimethylsiloxy,
ethyldimethylsiloxy,
dimethylphenylsiloxy,
dimethyl-3,3,3-trifluoropropylsiloxy,
dimethylvinylsiloxy,
diethylmethylsiloxy,
triethylsiloxy,
methyldiphenylsiloxy,
triphenylsiloxy,
diethylphenylsiloxy,
ethyldiphenylsiloxy,
diethyl-3,3,3-trifluoropropylsiloxy,
ethylmethylphenylsiloxy,
diethylvinylsiloxy,
diphenyl-3,3,3-trifluoropropylsiloxy,
diphenylmethyl-3,3,3-trifluoropropylsiloxy,
ethylmethylvinylsiloxy,
ethylphenyl-3,3,3-trifluoropropylsiloxy,
diphenylvinylsiloxy,
methylphenyl-3,3,3-trifluoropropylsiloxy,
ethylphenylvinylsiloxy,
phenyl-3,3,3-trifluoropropylvinylsiloxy,
methylphenylvinylsiloxy,
ethyl-3,3,3-trifluoropropylvinylsiloxy and
methyl-3,3,3-trifluoropropylvinylsiloxy.

The preferred polydiorganosiloxane (A) is one terminated by vinyldiorganosiloxy groups, as illustrated by the formula $$(CH_2=CH)R_2SiO(R_2SiO)_zSiR_2(CH=CH_2)$$

where each R radical is a radical as defined above for the organic groups and z has a value such that the viscosity is from 100 to 10,000 cp. at 25° C.

The polydiorganosiloxanes (A) are well known in the art and many are commercially available.

The mixture (B) of silicon containing compounds having silicon-bonded hydrogen atoms is composed essentially of (1) an organosiloxane having two silicon-bonded hydrogen atoms per molecule and (2) an organosiloxane having 3 to 10 silicon-bonded hydrogen atoms per molecule. The mixture (B) is present in an amount such that there is from 0.75 to 1.50 silicon-bonded hydrogen atoms per vinyl radical of polydiorganosiloxane (A). Preferably, mixture (B) is present to provide from 0.90 to 1.10 silicon-bonded hydrogen atoms per vinyl radical of the polydiorganosiloxane (A).

The composition of mixture (B) is such that at least derived from (1) and at least 10 percent of the silicon-bonded hydrogen atoms are derived from (2), where the total of (1) and (2) provides 100 weight percent of mixture (B).

The improved properties observed in the cured compositions of the present invention are dependent upon the unique combination of ingredients (A) and (B), and the presence in (B) of organosiloxane compounds (1) having two silicon-bonded hydrogen atoms per molecule and organosiloxane compounds (2) having 3 to 10 silicon-bonded hydrogen atoms per molecule.

Curable compositions, platinum catalyzed, having vinylorganosiloxane polymers cross-linked by silicon compounds having 3 or more silicon-bonded hydrogen atoms per molecule are known. However, these compositions have poorer physical properties where compared with the composition of the present invention where the silicon-bonded hydrogen atoms are derived from two types of organosiloxane compounds.

Organosiloxane compound (1) contains two silicon-bonded hydrogen atoms per molecule, the organic radicals are alkyl radicals of 1 to 12 carbon atoms, such as methyl, ethyl, butyl, propyl, isopropyl, hexyl, octyl, decyl and dodecyl, phenyl or 3,3,3-trifluoropropyl, no silicon atom has more than one silicon-bonded hydrogen atom and the organosiloxane compound can contain up to 500 silicon atoms per molecule. The organosiloxane compounds (1) can be composed of siloxane units having silicon-bonded hydrogen atoms, such as $HSiO_{1.5}$, $R'HSiO$ and $R'_2HSiO_{0.5}$ and organosiloxane units, such as $$R'SiO_{1.5}$$

$R'_2SiO$ and $R'_3SiO_{0.5}$, where $R'$ is an alkyl radical having from 1 to 12 carbon atoms, phenyl or 3,3,3-trifluoropropyl. The organosiloxane compounds (1) can also contain $SiO_2$ units.

Organosiloxane compounds (1) can be illustrated by compounds of the formulae, such as, $$HR'_2SiO(R'_2SiO)_aSiR'_2H$$
$$R'_3SiO(R'HSiO)_2(R'_2SiO)_aSiR'_3$$
$$HR'_2SiO(R'_2SiO)_a(R'HSiO)SiR'_3$$

where $R'$ is defined above and $a$ is an integer up to 498, and copolymers having two units of $HSiO_{1.5}$, $R'HSiO$, $R'_2HSiO_{0.5}$ or various combinations thereof and the remaining units being selected from $R'SiO_{1.5}$, $R'_2SiO$, $R'_3SiO_{0.5}$ and $SiO_2$ units, for example, a copolymer containing two units of $HSiO_{1.5}$ and the remaining units being $R'_2SiO$ and $R'_3SiO_{0.5}$, a copolymer containing two $R'_2HSiO_{0.5}$ units and the remaining units being $R'_2SiO_{1.5}$ and $R'_3SiO_{0.5}$, and a copolymer containing one $HSiO_{1.5}$ unit, one $R'HSiO$ unit and the remaining units being $R'_2SiO$, $R'_3SiO_{0.5}$ and $SiO_2$. The organosiloxane compounds (1) include cyclic compounds such as

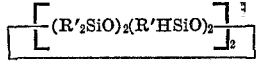

The organosiloxane compounds (1) are known in the art and can be prepared by known methods. The preferred organosiloxane compounds (1) are those of the formulae $$HR'_2SiO(R'_2SiO)_xSiR'_2H$$
and
$$R'_3SiO(R'HSiO)_2(R'_2SiO)_xSiR'_3$$

where $R'$ is a methyl radical and $x$ is 0 to 50 inclusive. Another preferred organosiloxane compound (1) is the cyclic compounds of the formula

where $R'$ is an alkyl radical having from 4 to 10 carbon atoms.

The organosiloxane compound (2) contains 3 to 10 inclusive silicon-bonded hydrogen atoms per molecule, the organic radicals are alkyl radicals having from 1 to 12 carbon atoms such as methyl, ethyl, propyl, isopropyl, hexyl, butyl, octyl, decyl, and dodecyl, phenyl or 3,3,3-trifluoropropyl, no silicon atom has more than one silicon-bonded hydrogen atom and the organosiloxane compound (2) can contain up to 75 silicon atoms per molecule. The organosiloxane compounds (2) can be composed of siloxane units having silicon-bonded hydrogen atoms, such as, $HSiO_{1.5}$, $R'HSiO$ and $R'_2HSiO_{0.5}$ and organosiloxane units, such as, $R'SiO_{1.5}$, $R'_2SiO$ and $R'_3SiO_{0.5}$ where $R'$ is defined above. The organosiloxane compounds (2) can also contain $SiO_2$ units.

Organosiloxane compounds (2) can be illustrated by compounds of the formulae, such as, $$R'_3SiO(R'HSiO)_y(R'_2SiO)_bSiR'_3$$

$$HR'_2SiO(R'HSiO)_y(R'_2SiO)_bSiR'_2H$$

$R'Si[(OSiR_2)_bOSiR'_2H]_3$, $Si[(OSiR'_2)_bOSiR'_2H]_4$, a copolymer containing three to ten $HSiO_{1.5}$ units and the remaining units being $R'_2SiO$ and $R'_3SiO_{0.5}$, a copolymer containing three to ten $HSiO_{1.5}$ units and the remaining units being $R'_3SiO_{0.5}$, $R'_2SiO$ and $SiO_2$, a copolymer containing three to ten $HSiO_{1.5}$ units and the remaining units being $R'SiO_{1.5}$, $R'_2SiO$ and $R'_3SiO_{0.5}$, a copolymer containing three to ten $HSiO_{1.5}$ units and the remaining units being $R'SiO_{1.5}$ and $R'_3SiO_{0.5}$, a copolymer containing three to ten $R'HSiO$ units and the remaining units being $R'SiO_{1.5}$ and $R'_3SiO_{0.5}$, a copolymer containing three to ten $R'HSiO$ units and the remaining units being $R'SiO_{1.5}$, $R'_2SiO$ and $R'_3SiO_{0.5}$, a copolymer containing three to ten $R'HSiO$ units and the remaining units being $R'_2SiO$, $R'_3SiO_{0.5}$ and $SiO_2$, a copolymer containing three to ten units of $R'_2HSiO_{0.5}$ and the remaining units being $R'_2SiO$, $R'SiO_{1.5}$ and $R'_3SiO_{0.5}$, a copolymer containing three to ten $R'_2HSiO_{0.5}$ units and the remaining units being $R'_3SiO_{0.5}$, $R'SiO_{1.5}$ and $SiO_2$ and a copolymer containing three to ten units of $R'HSiO$, $R'_2HSiO_{0.5}$ and $HSiO_{1.5}$ and the remaining units being $R'SiO_{1.5}$, $R'_3SiO_{0.5}$ and $SiO_2$. The organosiloxane compounds (2) include cyclic compounds such as $$[(R'_2SiO)(R'HSiO)_3]$$

The organosiloxane compounds (2) are well known in the art and can be prepared by known methods. The preferred organosiloxane compounds (2) are those of the formulae $R'_3SiO(HR'SiO)_y(R'_2SiO)_wSiR'_3$, $$HR'_2SiO(R'HSiO)_y(R'_2SiO)_wSiR'_2H$$

$R'Si[(OSiR'_2)_wOSiR'_2H]_3$ and $Si[(OSiR'_2)_wOSiR'_2H]_4$ where $R'$ is defined above, $y$ is 3 to 10 and $w$ is 0 to 40. Another preferred organosiloxane compound (2) is the cyclic compounds of the formula $$[(CH_3)R'SiO][(CH_3)HSiO]_3$$

where $R'$ is an alkyl radical having from 4 to 10 carbon atoms.

The cyclic compounds of organosiloxane compounds of (1) and (2) can be prepared by well-known methods such as by the reaction of $$[(CH_3)HSiO]_4$$

with alkenes having 2 to 12 carbon atoms in the presence of a platinum catalyst. The reaction is essentially quantitative particularly when heated at temperatures up to about 100° C. The desired product, for example, can readily be obtained by combining the alkene and $$[(CH_3)HSiO]_4$$

in the proper proportions. For example, if $$[(CH_3)(C_8H_{17})SiO]_2[(CH_3)HSiO]_2$$

is desired, the ratio of octene to $[(CH_3)HSiO]_4$ should be 2 to 1. Since the resulting product will also contain other species, the product can be readily obtained by distillation. The cyclic compounds containing only methyl radicals can be readily obtained by the cohydrolysis of dimethyldichlorosilane and monomethyldichlorosilane and distillation of the resulting product mixture.

The compositions of the present invention are curable by the addition of a platinum catalyst. The platinum catalyst can cure the composition of the present invention at room temperature. The platinum catalyzed composition of the present invention can be stabilized by maintaining the composition at a low temperature such as $-20$ to $-50°$ C. or by use of an inhibitor. The shelf life of any particular catalyzed composition will depend upon the nature of the platinum catalyst as well as on the other ingredients. Long shelf lives can readily be obtained by the use of a platinum catalyst inhibitor.

The platinum catalyst can be any of the platinum catalysts known to catalyze the addition of silicon-bonded hydrogen atoms to silicon-bonded vinyl radicals. Platinum catalyst can be any of the known forms, ranging from platinum as such, or as deposited on carriers such as silica gel or powdered charcoal, to platinic chloride, salts of platinum and chloroplatinic acid. Any of these forms will function in the instant curing system. A preferred form of platinum is the chloroplatinic acid either as the commonly obtainable hexahydrate or the anhydrous form, on account of its easy dispersability in organosilicon systems and its non-effect on color of the mixture. Additional platinum compounds which include, $$PtCl_2[P(CH_2CH_2CH_3)_3]_2$$

platinum bromides, a complex of platinous halide and an olefin such as ethylene, propylene, butylene, a diorganovinyldisiloxane, cyclohexane and styrene, $$Pt(CH_3CN)_2Cl_2$$

trimethylplatinum iodide, $[Pt(CH_3CN)_2(CH_3)_4]Cl_2$, $Pt(NH_3)_2Cl_2$, $K[PtCl_3CH_2CH_2CH_2OH]$ hexamethyldiplatinum, $PtBr_2(C_2H_4)_2$, $K[PtBr_3(C_2H_4)]$, $PtCl_2(C_2H_4)$, $(CH_3)_2C=CH_2\cdot PtCl_2$, $H_2Pt(CN)_4\cdot 5H_2O$, $$H[PtCl_3(CH_3CN)]$$

$Pt(NH_3)_2(CNS)_2$, $PtCl_2\cdot PCl_3$, $[Pt(NH_3)_4]\cdot [PtCl_4]$, $PtCl_2[P(CH_2CH_3)_3]_2$, $PtCl_2\cdot P(OH)_3$, $$PtCl_2\cdot (OCH_2CH_3)_3$$

$PtCl_2\cdot [P(OCH_2CH_3)_3]_2$, $Pt(OOCCH_2SCH_2CH_3)_2$, $$Pt(CN)_3, (CH_3)_4Pt, (CH_3)_3Pt-Pt(CH_3)_3,$$

$$(CH_3)_3Pt(CH_3COCH=\overset{-O}{\overset{|}{C}}CH_3)$$

$PtCl_2CO$ and $PtBr_2CO$.

There should be at least 0.1 part by weight platinum per million parts by weight of the combined total weight of (A) and (B). However, since impurities in the system may easily poison this small quantity of catalyst, it is preferred to employ from 1 to 20 parts per million of platinum. A greater amount of the platinum does not affect the reaction, but does affect the cost and economic considerations thus suggesting the lower amounts mentioned.

The platinum catalyst can also be inhibited by the presence of a platinum catalyst inhibitor, such as, the aromatic heterocyclic nitrogen compounds, pyridazine, pyrazine, quinoline, 2,2'-biquinoline, bipyridine, naphthyridine, quinaldine, dialkyl formamides, thioamides, alkylthioureas and ethylene thiourea as described in U.S. Pat. No. 3,188,299, the organophosphorus compounds as described in U.S. Pat. No. 3,188,300, benzotriazole as described in U.S. Pat. No. 3,192,181, the nitrile compounds as described in U.S. Pat. No. 3,344,111, the halocarbons described in U.S. Pat. No. 3,383,356, the acetylenic compounds described in U.S. Pat. No. 3,445,420, the vinyl silazanes described in U.S. Pat. No. 3,453,233, the sulfoxide compounds described in U.S. Pat. No. 3,453,234, the stannous salts, the mercuric salts, the bismuth (+3) salts, the cuprous salts and the cupric salts described in U.S. Pat. No. 3,532,649 and others which may be known in the art. The patents cited above are hereby incorporated by reference to include the methods of using the platinum catalyst inhibitors, the specific platinum catalyst inhibitors and additional detailed description of platinum catalyst.

In addition to the recited components, other materials can be present in the composition of the present invention. Such materials as are ordinarily used in organosilicon compositions, such as, filler illustrated by carbon black, silica aerogels, silica soots, treated silicas, alumina, clays, metal oxides, metal carbonates, metal silicas and the like. The reinforcing silica fillers are particularly useful in the present compositions to further increase the elastomeric properties. Other materials include, pigments to impart certain colors to the material, rubber additives such as compression set aids, plasticizers and the like. Materials that are known to poison platinum catalyst should, of course, be excluded.

The composition of the present invention can be prepared by mixing the ingredients in any desired manner and the order of mixing is not critical. The mixing can be by milling, by a mechanical mixer, by hand and the like.

The compositions of the present invention have, in the cured state, improved physical properties, such as tensile strength, elongation, tear strength and combinations thereof compared to a cured composition derived from only (A) a polydiorganosiloxane having two vinyl radicals per molecule, (2) an organosiloxane compound containing from 3 to 10 silicon-bonded hydrogen atoms per molecule and a platinum catalyst. The combination of (A), (2) and a platinum catalyst is a curable composition similar to those known in the art. The combination of (1) and (2) is limited in the present invention and used in the composition of the present invention to provide elastomeric properties similar to compositions based on high molecular weight gums. However, the compositions of the present invention have the property of easy handling, since the viscosities are low. The improved tensile strength, elongation and tear strength of the cured compositions of the present invention are achieved from a combination of factors, which are the ratio of silicon-bonded hydrogen atoms to vinyl radicals, the use of two SiH organosiloxane compounds wherein one has two silicon-bonded hydrogen atoms per molecule and the other has three to ten silicon-bonded hydrogen atoms per molecule, and a polydiorganosiloxane having two vinyl radicals per molecule. The compositions of the present invention also cure to elastomeric materials having a lower modulus.

The compositions of the present invention cure to elastomeric materials which find use in the same areas as other silicone elastomers. The compositions of the present invention can be used as sealants, encapsulants, insulation, coatings, molded parts and the like.

The following examples are illustrative only and should not be construed as limiting the present invention which is properly delineated in the claims.

EXAMPLE 1

Several mixtures consisting of 100 grams of a vinyldimethylsiloxy endblocked polydimethylsiloxane having a viscosity of 1280 cp. at 25° C. and two vinyl groups per molecule and 34.5 grams of a trimethylsiloxy treated fumed silica having a surface area of 250 square meters per gram were prepared. To each mixture an amount of organosiloxane compounds were added to provide the equivalents of silicon-bonded hydrogen atoms per 100 grams of vinyldimethylsiloxy endblocked polydimethylsiloxane as shown in Table I. The percentage of equivalents of silicon-bonded hydrogen atoms from each of two organosiloxane compounds is shown in Table I. One organosiloxane compound, designated A in Table I, was a copolymer consisting of 20 mol percent trimethylsiloxane units, 30 mol percent dimethylsiloxane units and 50 mol percent methylhydrogensiloxane units and having an average of 5 silicon-bonded hydrogen atoms per molecule. The other organosilicon compound, designated B in Table I, was a dimethylhydrogensiloxy endblocked polydimethylsiloxane having an average of 10 siloxane units per molecule. The equivalents of vinyl in 100 grams of the vinyldimethylsiloxy endblocked polydimethylsiloxane was 0.0122. The resulting mixtures were catalysed with 5 p.p.m. platinum per 100 grams of vinyldimethylsiloxy endblocked polydimethylsiloxane. The platinum was added in the form of a chloroplatinic acid catalyst in a methylsiloxane fluid having 1.26 weight percent platinum. After thoroughly mixing the above ingredients, each mixture was de-aired and then cast in 6 inch by 6 inch test specimens which were 1/16 of an inch thick. Each specimen was cured for 2 hours at 100° C. The uncured composition had a viscosity of about 300 poises at 2 r.p.m. Brookfield viscosity.

TABLE I

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | A | B | | | | | |
| 1 | 0.0108 | 100 | 0 | 40 | 800 | 370 | 47 | |
| 2 | 0.0125 | 100 | 0 | 32 | 680 | 440 | 45 | 130 |
| 3 | 0.0125 | 75 | 25 | 29 | 720 | 510 | 60 | 100 |
| 4 | 0.0127 | 50.5 | 49.5 | 24 | 900 | 650 | 66 | 80 |
| 5 | 0.0141 | 50.5 | 49.5 | 17 | 750 | 650 | 90 | 60 |
| 6 | 0.0153 | 50.5 | 49.5 | 18 | 670 | 630 | 80 | 60 |
| 7 | 0.0110 | 38.3 | 61.7 | 11 | 550 | 765 | 81 | 40 |
| 8 | 0.0122 | 38.3 | 61.7 | 23 | 840 | 660 | 100 | 70 |
| 9 | 0.0134 | 38.3 | 61.7 | 26 | 1,000 | 670 | 95 | 80 |
| 10 | 0.0110 | 28.5 | 71.5 | 13 | 650 | 900 | 90 | 40 |
| 11 | 0.0123 | 28.5 | 71.5 | 18 | 870 | 800 | 130 | 60 |
| 12 | 0.0136 | 28.5 | 71.5 | | 800 | 700 | 140 | 60 |
| 13 | 0.0125 | 25 | 75 | 20 | 1,050 | 940 | 140 | 50 |
| 14 | 0.0124 | 19.5 | 80.5 | 22 | 1,150 | 900 | 130 | 60 |
| 15 | 0.0137 | 19.5 | 80.5 | 11 | 650 | 950 | 130 | 30 |
| 16 | 0.0126 | 10.0 | 90.0 | 19 | 1,300 | 1,100 | 210 | 50 |
| 17 | 0.0139 | 10.0 | 90.0 | 17 | 700 | 1,050 | 200 | 30 |

Table I shows that the elastomers having a combination of A and B compounds have improved properties compared to the cross-linking compound A alone. The specimens showed increased elongation and tear strength and tensile strengths were not significantly decreased.

EXAMPLE 2

Example 1 was repeated except that instead of compound A, an organosiloxane compound, designated C in Table II, was used and was a copolymer consisting of 20 mol percent trimethylsiloxane units, 50 mol percent dimethylsiloxane units and 30 mol percent methylhydrogensiloxane units and having 3 silicon-bonded hydrogen atoms per molecule. The results are shown in Table II.

EXAMPLE 4

Example 1 was repeated except that instead of compound A, an organosiloxane compound, designated E in Table IV, was used and was a compound of the formula $Si[OSi(CH_3)_2H]_4$. The results are shown in Table IV.

TABLE IV

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | E | B | | | | | |
| 1 | 0.0115 | 100 | 0 | 35 | 800 | 410 | 67 | 150 |
| 2 | 0.0126 | 100 | 0 | 37 | 850 | 400 | 80 | 160 |
| 3 | 0.0137 | 100 | 0 | 37 | 700 | 330 | 85 | 170 |
| 4 | 0.0149 | 100 | 0 | 35 | 900 | 400 | 86 | 143 |
| 5 | 0.0115 | 50.8 | 49.2 | 30 | 1,070 | 630 | 62 | 90 |
| 6 | 0.0126 | 50.8 | 49.2 | 29 | 1,100 | 640 | 60 | 87 |
| 7 | 0.0137 | 50.8 | 49.2 | 23 | 1,150 | 770 | 83 | 60 |
| 8 | 0.0149 | 50.8 | 49.2 | 17 | 1,050 | 850 | 110 | 50 |

EXAMPLE 5

Example 1 was repeated except that instead of compounds A and B, an organosilioxane compound, designated as F in Table V, of the formula $$(CH_3)_3SiO[(CH_3)HSiO]_3Si(CH_3)_3$$

was used instead of compound A and an organosiloxane compound, designated as G in Table V, of the formula

TABLE II

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | C | B | | | | | |
| 1 | 0.0115 | 100 | 0 | 25 | 500 | 400 | — | 98 |
| 2 | 0.0126 | 100 | 0 | 30 | 700 | 400 | 50 | 125 |
| 3 | 0.0137 | 100 | 0 | 32 | 850 | 480 | 48 | 130 |
| 4 | 0.0109 | 50 | 50 | 18 | 820 | 820 | 100 | 50 |
| 5 | 0.0121 | 50 | 50 | 27 | 1,200 | 750 | 80 | 80 |
| 6 | 0.0133 | 50 | 50 | 24 | 1,060 | 750 | 90 | 60 |
| 7 | 0.0109 | 30 | 70 | 21 | 1,170 | 930 | 120 | 61 |
| 8 | 0.0121 | 30 | 70 | 23 | 1,200 | 900 | 140 | 64 |
| 9 | 0.0133 | 30 | 70 | 15 | 800 | 940 | 130 | 45 |
| 10 | 0.0109 | 20 | 80 | 13 | 730 | 1,100 | 125 | 30 |
| 11 | 0.0121 | 20 | 80 | 17 | 900 | 1,100 | 170 | 30 |
| 12 | 0.0116 | 10 | 90 | 18 | 1,100 | 1,250 | 200 | 40 |
| 13 | 0.0127 | 10 | 90 | 14 | 780 | 1,300 | 155 | 30 |

EXAMPLE 3

Example 1 was repeated except that instead of compound A, an organosiloxane compound, designated D in Table III, was used an was a compound of the formula $(CH_3)_3SiO[(CH_3)SHiO]_4Si(CH_3)_3$. The results are shown in Table III.

TABLE III

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | D | B | | | | | |
| 1 | 0.0102 | 100 | 0 | 27 | 870 | 570 | 57 | 84 |
| 2 | 0.0115 | 100 | 0 | 34 | 850 | 450 | 41 | 125 |
| 3 | 0.0126 | 100 | 0 | 38 | 900 | 430 | 43 | 140 |
| 4 | 0.0137 | 100 | 0 | 37 | 950 | 450 | 42 | 135 |
| 5 | 0.0102 | 50.7 | 49.3 | 17 | 1,100 | 950 | 110 | 50 |
| 6 | 0.0115 | 50.7 | 49.3 | 27 | 1,180 | 740 | 65 | 70 |
| 7 | 0.0126 | 50.7 | 49.3 | 29 | 1,100 | 650 | 63 | 80 |
| 8 | 0.0137 | 50.7 | 49.3 | 24 | 1,200 | 800 | 70 | 70 |
| 9 | 0.0102 | 30.6 | 69.4 | 14 | 930 | 1,160 | 132 | 30 |
| 10 | 0.0115 | 30.6 | 69.4 | 26 | 1,300 | 850 | 88 | 64 |
| 11 | 0.0126 | 30.6 | 69.4 | 24 | 1,380 | 900 | 132 | 60 |
| 12 | 0.0137 | 30.6 | 69.4 | 14 | 900 | 1,180 | 137 | 30 |
| 13 | 0.0115 | 30 | 70 | 20 | 1,150 | 910 | 130 | 50 |
| 14 | 0.0126 | 30 | 70 | 22 | 1,100 | 850 | 147 | 50 |
| 15 | 0.0137 | 30 | 70 | 12 | 920 | 1,160 | 129 | 30 |

$(CH_3)_3SiO[(CH_3)HSiO]_2Si(CH_3)_3$ was used instead of compound B. The results are shown in Table V.

TABLE V

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | F | G | | | | | |
| 1 | 0.0106 | 100 | 0 | 30 | 1,250 | 570 | 57 | |
| 2 | 0.0128 | 100 | 0 | 15 | 950 | 800 | 98 | |
| 3 | 0.0106 | 90 | 10 | 30 | 1,300 | 620 | 65 | |
| 4 | 0.0129 | 90 | 10 | 14 | 1,000 | 920 | 130 | |
| 5 | 0.0106 | 75 | 25 | 26 | 1,400 | 710 | 92 | |
| 6 | 0.0128 | 75 | 25 | 12 | 890 | 1,050 | 150 | |
| 7 | 0.0106 | 50 | 50 | 22 | 1,210 | 870 | 120 | |

EXAMPLE 6

Example 1 was repeated except that instead of compound A, an organosiloxane compound, designated as H in Table VI, of the formula $C_6H_5Si[OSi(CH_3)_2H]_3$ was used. The results are shown in Table VI.

TABLE VI

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | H | B | | | | | |
| 1 | 0.0114 | 100 | 0 | 25 | 1,300 | 820 | 70 | 60 |
| 2 | 0.0114 | 75 | 25 | 19 | 1,300 | 1,190 | 165 | 40 |
| 3 | 0.0139 | 50.6 | 49.4 | 13 | 950 | 1,100 | 175 | 40 |
| 4 | 0.0114 | 50 | 50 | 18 | 1,400 | 1,000 | 130 | 51 |
| 5 | 0.0127 | 50 | 50 | 21 | 1,380 | 950 | 119 | 51 |
| 6 | 0.0139 | 50 | 50 | 18 | 1,100 | 1,100 | 160 | 36 |

EXAMPLE 7

Two mixtures were prepared as described in Example 1 except that 39.1 grams of a trimethylsiloxy treated fumed silica having a surface area of 400 square meters per gram was used in place of the 34.5 grams of the trimethylsiloxy treated fumed silica having a surface area of 250 square meters per gram. The results are shown in Table VII. Comparisons with other elastomers are also shown in Table VII.

TABLE VII

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | D | B | | | | | |
| 1 | 0.0115 | 30 | 70 | 16 | 1,210 | 1,160 | 136 | 30 |
| 2 | 0.0126 | 30 | 70 | 15 | 1,290 | 1,180 | 148 | 30 |
| Ex.: | | | | | | | | |
| 3, 2 | 0.0115 | 100 | 0 | 34 | 850 | 450 | 41 | 125 |
| 3, 3 | 0.0126 | 100 | 0 | 38 | 900 | 430 | 43 | 140 |
| 3, 13 | 0.0115 | 30 | 70 | 20 | 1,150 | 910 | 130 | 50 |
| 3, 14 | 0.0126 | 30 | 70 | 22 | 1,100 | 850 | 147 | 50 |

EXAMPLE 8

Two mixtures were prepared as described in Example 7 except that the amount of the fumed silica was 48.0 grams. The results with comparisons are shown in Table VIII.

TABLE VIII

| Specimen No.: | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | D | B | | | | | |
| 1 | 0.0115 | 30 | 70 | 22 | 1,280 | 1,030 | 149 | 50 |
| 2 | 0.0126 | 30 | 70 | 16 | 1,000 | 1,200 | 157 | 30 |
| Ex.: | | | | | | | | |
| 3, 2 | 0.0115 | 100 | 0 | 34 | 850 | 450 | 41 | 125 |
| 3, 3 | 0.0126 | 100 | 0 | 38 | 900 | 430 | 43 | 140 |
| 3, 13 | 0.0115 | 30 | 70 | 20 | 1,150 | 910 | 130 | 50 |
| 3, 14 | 0.0126 | 30 | 70 | 22 | 1,100 | 850 | 147 | 50 |

EXAMPLE 9

Two mixtures consisting of 100 grams of a vinyldimethylsiloxy endblocked polydimethylsiloxane having a viscosity of 424 cp. at 25° C. and two vinyl groups per molecule and 34.5 grams of a trimethylsiloxy treated fumed silica having a surface area of 250 square meters per gram were prepared. To each mixture organosiloxane compounds having silicon-bonded hydrogen atoms were added and the mixture was catalyzed and cured as described in Example 1. The organosiloxane compounds having silicon-bonded hydrogen atoms are indicated in Table IX which also shows the results, Specimen Nos. 1 and 2. The equivalents of vinyl in 100 grams of the vinyldimethylsiloxy endblocked polydimethylsiloxane was 0.0200.

Three mixtures were prepared as described above except that 46 grams of the fumed silica was used in place of the 34.5 grams. The results are shown in Table IX, Specimen Nos. 3, 4 and 5.

Another composition was prepared in the same manner as Specimen No. 16 of Example 1, except that 50 grams of micron quartz was added. The cured elastomer had a durometer on the Shore A scale of 29, a tensile strength at break of 840 p.s.i., an elongation at break of 750 percent, and a tear strength, die "B," of 240 p.p.i.

EXAMPLE 12

When the following organosiloxane compounds replace compound A in Example 1, equivalent results are obtained.

TABLE IX

| | Equivalents added per 100 g. of vinyl polymer | Percent of SiH equivalents from compound— | | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| | | D | B | | | | | |
| Ex.: | | | | | | | | |
| 3, 1 | 0.0102 | 100 | 0 | 27 | 870 | 570 | 57 | 84 |
| 3, 2 | 0.0115 | 100 | 0 | 34 | 850 | 450 | 41 | 125 |
| 3, 3 | 0.0126 | 100 | 0 | 38 | 900 | 430 | 43 | 140 |
| 3, 4 | 0.0137 | 100 | 0 | 37 | 950 | 450 | 42 | 135 |
| 3, 13 | 0.0115 | 30 | 70 | 20 | 1,150 | 910 | 130 | 50 |
| 3, 14 | 0.0126 | 30 | 70 | 22 | 1,100 | 850 | 147 | 50 |
| 3, 15 | 0.0137 | 30 | 70 | 12 | 920 | 1,160 | 129 | 50 |
| Specimen No.: | | | | | | | | |
| 1 | 0.0186 | 30 | 70 | 16 | 1,060 | 930 | 82 | 40 |
| 2 | 0.0214 | 30 | 70 | 20 | 1,100 | 860 | 67 | 50 |
| 3 | 0.0180 | 30 | 70 | 14 | 1,030 | 1,070 | 212 | 30 |
| 4 | 0.0202 | 30 | 70 | 26 | 1,250 | 780 | 121 | 60 |
| 5 | 0.0224 | 30 | 70 | 13 | 900 | 1,100 | 141 | 30 |

EXAMPLE 10

Elastomers having improved physical properties were obtained from a mixture having equal amounts of vinyl groups and a silicon-bonded hydrogen atoms and consisting of a vinyldimethylsiloxy endblocked poly-3,3,3-trifluoropropylmethylsiloxane having a viscosity of 8000 cp. at 25° C., $$H(CH_3)_2SiO[(CH_3)(CF_3CH_2CH_2)SiO]_3Si(CH_3)_2H$$

(compound K) and

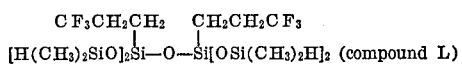 (compound L)

A mixture of compound K and compound L provided the amount of silicon-bonded hydrogen atoms equivalent to the amount of vinyl groups in the vinyldimethylsiloxy endblocked poly-3,3,3-trifluoropropylmethylsiloxane. Four mixtures were prepared with compound K providing 85%, 75%, 50% and 25% of the silicon-bonded hydrogen atoms and compound L providing respectively 15%, 25%, 50% and 75% of the silicon-bonded hydrogen atoms. In each composition the elastomer had improved physical properties compared to an elastomer prepared from only the vinyldimethylsiloxy endblock poly-3,3,3-trifluoropropylmethylsiloxane and compound L.

EXAMPLE 11

An elastomeric composition was prepared in the same manner as Specimen No. 16 of Example 1, except that 25 grams of 5 micron quartz was added. The cured elastomer had a durometer on the Shore A scale of 23, a tensile strength at break of 920 p.s.i., an elongation at break of 920 percent, and a tear strength, die "B," of 200 p.p.i.

(a) $[(C_6H_5)(CH_3)HSiO]_4Si$
(b) $(CH_3)_3SiO[H(CH_3)SiO]_{10}Si(CH_3)_3$
(c) $(CH_3)_3SiO[H(CH_3)SiO]_8[(CH_3)_2SiO]_{65}Si(CH_3)_3$
(d) copolymer consisting of 5 units of $HSiO_{1.5}$, 5 units of $(CH_3)_2SiO$ and 5 units of $(CH_3)_2(CH_3CH_2)SiO_{0.5}$
(e) $H(CH_3)_2SiO[H(CH_3)SiO]_6[(CH_3)_2SiO]_{11}$
  $[(C_6H_5)(CH_3)SiO]_4Si(CH_3)_2H$
(f) $(CH_3)_3SiO[H(CH_3)SiO]_4[(CH_3)_2SiO]_{40}Si(CH_3)_3$

EXAMPLE 13

When the following organosiloxane compounds replace compound B in Example 1, equivalent results are obtained.

(a) $H(CH_3)_2SiO[(CH_3)_2SiO]_{498}Si(CH_3)_2H$
(b) $H(CH_3)_2SiO[(CH_3)_2SiO]_{50}Si(CH_3)_2H$
(c) $H(CH_3)_2SiOSi(CH_3)_2H$
(d) $H(CH_3)(C_6H_5)SiOSi(CH_3)(C_6H_5)H$
(e) $H(CH_3)_2SiO[(CH_3)(CF_3CH_2CH_2)SiO]_{12}Si(CH_3)_2H$
(f) $H(CH_3CH_2)_2SiOSi(CH_2CH_3)_2H$
(g) $(CH_3)_3SiO[(CH_3CH_2)HSiO]_2Si(CH_3)_3$

EXAMPLE 14

When the following vinyl containing siloxane polymers replace the vinyldimethylsiloxy endblocked polydimethylsiloxane of Example 1, equivalent results are obtained.

(a) vinyldimethylsiloxy endblocked polydimethylsiloxane having a viscosity of 100 cp. at 25° C. and two vinyl radicals per molecule.
(b) vinylphenylmethylsiloxy endblocked polydimethylsiloxane having a viscosity of 10,000 cp. at 25° C. and two vinyl radicals per molecule.

(c) vinyldimethylsiloxy endblocked polyethylmethylsiloxane having a viscosity of 5,000 cp. at 25° C. and two vinyl radicals per molecule.

After thoroughly mixing the ingredients, test specimens were cast as described in Example 1 and cured for 10 minutes at 150° C. The results were as shown in Table XI.

TABLE XI

| Specimen No. | Percent of SiH equivalents from compound— J | K | Durometer, Shore A Scale | Tensile strength at break, p.s.i. | Elongation at break, percent | Tear strength die "B", p.p.i. | Modulus at 150% p.s.i. |
|---|---|---|---|---|---|---|---|
| 1 | 100 | 0 | 28 | 1,410 | 847 | 41 | 77 |
| 2 | 86.5 | 13.5 | 14 | 1,120 | 1,175 | 107 | 40 |
| 3 | 52.8 | 47.2 | 18 | 1,520 | 1,190 | 92 | 40 |

(d) vinyldimethylsiloxy endblocked polydiorganosiloxane having 75 mol percent dimethylsiloxane units and 25 mol percent phenylmethylsiloxane units and two vinyl radicals per molecule and a viscosity of 1000 cp. at 25° C.

(e) trimethylsiloxy endblocked polydiorganosiloxane having two ethylvinylsiloxane units and the remaining units being dimethylsiloxane and a viscosity of 2500 cp. at 25° C.

EXAMPLE 15

When the following platinum catalysts replace the platinum catalyst of Example 1, equivalent results are obtained.

(a) platinum deposited on charcoal
(b) hexamethyldiplatinum
(c) $PtCl_2(C_2H_4)$
(d) $H_2PtCl_6 \cdot 6H_2O$
(e) $H_2PtCl_6 \cdot 6H_2O$ inhibited with stannous octoate

EXAMPLE 16

Example 5 was repeated except that the specimens were cured by allowing them to set at room temperature for 7 days. The results are shown in Table X.

TABLE X

| Specimen No.: | Equivalents added per 100 g. of vinyl polymer | Percent of SiH equivalents from compound— F | G | Durometer, Shore A Scale | Tensile strength at break, p.s.i. | Elongation at break, percent | Tear strength die "B," p.p.i. | Modulus at 150% p.s.i. |
|---|---|---|---|---|---|---|---|---|
| 1 | 0.0115 | 50 | 50 | 20 | 1,280 | 950 | 130 | 48 |
| 2 | 0.0127 | 50 | 50 | 23 | 1,350 | 950 | 110 | 56 |
| 3 | 0.0139 | 50 | 50 | 15 | 1,200 | 1,150 | 135 | 38 |
| Ex. 5, 2 | 0.0128 | 100 | 0 | 15 | 950 | 800 | 98 | |

EXAMPLE 17

Several mixtures consisting of 100 parts by weight of a vinyldimethylsiloxy endblocked polydimethylsiloxane having a viscosity of 2000 cp. at 25° C. and two vinyl groups per molecule, 30 parts by weight of a trimethylsiloxy treated fumed silica filler and 0.002 part by weight of platinum added as a chloroplatinic acid catalyst. To each mixture an amount of organosiloxane compounds were added to provide 0.0128 equivalent of silicon-bonded hydrogen atoms per 100 parts by weight of vinyldimethylsiloxy endblocked polydimethylsiloxane. The percentages of equivalents of silicon-bonded hydrogen atoms from each of two organosiloxane compounds is shown in Table XI. One organosiloxane compound, designated J in Table XI, was

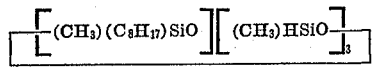

The other organosiloxane compound, designated K in Table XI, was

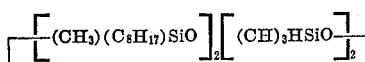

That which is claimed is:

1. A curable composition consisting essentially of
(A) a polydiorganosiloxane being terminated by triorganosiloxy groups and having two vinyl radicals per molecule, no silicon atom having more than one vinyl radical bonded thereto, the remaining organic radicals being selected from the group consisting of methyl, ethyl, phenyl and 3,3,3-trifluoropropyl radicals, at least 50 percent of the organic radicals being methyl radicals, and said polydiorganosiloxane having a viscosity of from 100 to 10,000 inclusive centipoise at 25° C.,
(B) a mixture of silicon containing compounds having silicon-bonded hydrogen atoms, there being present of from 0.75 to 1.50 silicon-bonded hydrogen atoms per vinyl radical of (A), said mixture (B) consisting essentially of
(1) an organosiloxane compound containing two silicon-bonded hydrogen atoms per molecule and the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, said organosiloxane compound (1) having no more than 500 silicon atoms per molecule, and
(2) an organosiloxane compound containing from 3 to 10 inclusive silicon-bonded hydrogen atoms per molecule and the organic radicals being selected from the group consisting of alkyl radicals having from 1 to 12 carbon atoms inclusive, phenyl and 3,3,3-trifluoropropyl radicals, no silicon atom having bonded thereto more than one silicon-bonded hydrogen atom, said organosiloxane compound (2) having no more than 75 silicon atoms per molecule,
said mixture (B) being such that at least 10 percent of the silicon-bonded hydrogen atoms are derived from (1) and at least 10 percent of the silicon-bonded hydrogen atoms are derived from (2), (1) and (2) composing 100 weight percent of mixture (B).

2. The composition in accordance with claim 1 in which there is present in (B) from 0.75 to 1.25 silicon-bonded hydrogen atoms per vinyl radical of (A) and said organic radicals of (1) and (2) are selected from the group consisting of methyl, ethyl, phenyl and 3,3,3-trifluoropropyl.

3. The composition in accordance with claim 1 wherein a platinum catalyst is present.

4. The composition in accordance with claim 1 wherein a reinforcing silica is also present.

5. The composition in accordance with claim 4 wherein a platinum catalyst is present.

6. The composition in accordance with claim 3 wherein a platinum catalyst inhibitor selected from the group consisting of aromatic heterocyclic nitrogen compounds, pyridazine, pyrazine, quinoline, 2,2'-biquinoline, bipyridine, naphthyridine, quinaldine, dialkyl formamides, thioamides, alkylthioureas, ethylene thiourea, organophosphorus compounds, benzotriazole, nitrile compounds, halocarbons, acetylenic compounds, vinylsilazanes, sulfoxide compounds, stannous salts, mercuric salts, bismuth (+3) salts, cuprous salts and cupric salts is present.

7. The composition in accordance with claim 5 wherein a platinum catalyst inhibitor selected from the group consisting of aromatic heterocyclic nitrogen compounds, pyridazine, pyrazine, quinoline, 2,2'-biquinoline, bipyridine, naphthyridine, quinaldine, dialkyl formamides, thioamides, alkylthioureas, ethylene thiourea, organophosphorous compounds, benzotriazole, nitrile compounds, halocarbons, acetylenic compounds, vinyl silazanes, sulfoxide compounds, stannous salts, mercuric salts, bismuth (+3) salts, cuprous salts and cupric salts is present.

8. The composition in accordance with claim 1 wherein (1) is selected from the group consisting of $(CH_3)_3SiO\{(CH_3)_2SiO\}_x\{H(CH_3)SiO\}_2Si(CH_3)_3$ and $H(CH_3)_2SiO\{(CH_3)_2SiO\}_xSi(CH_3)_2H$ and (2) is selected from the group consisting of $(CH_3)_3SiO\{H(CH_3)SiO\}_y\{(CH_3)_2SiO\}_wSi(CH_3)_3$ $H(CH_3)_2SiO\{H(CH_3)SiO\}_y\{(CH_3)_2SiO\}_wSi(CH_3)_2H$ $C_6H_5Si\{OSi(CH_3)_2H\}_3$, $\{(C_6H_5)(CH_3)HSiO\}_4Si$ $\{H(CH_3)_2SiO\}_4Si$ and $C_6H_5Si\{OSi(C_6H_5)(CH_3)H\}_3$ wherein $x$ has an average value of from 0 to 50 inclusive, $w$ has an average value of from 0 to 40 inclusive, and $y$ has an average value of from 3 to 10 inclusive.

9. The composition in accordance with claim 1 wherein (1) is

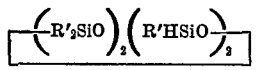

and (2) is

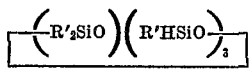

10. The composition in accordance with claim 9 wherein (1) is

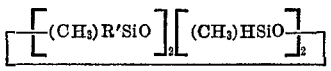

and (2) is

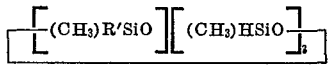

where R' is an alkyl radical having from 4 to 10 carbon atoms.

11. The composition in accordance with claim 10 wherein R' is octyl.

12. The composition in accordance with claim 10 wherein a platinum catalyst is present.

13. The composition in accordance with claim 12 wherein a reinforcing silica is present.

14. The composition in accordance with claim 11 wherein a platinum catalyst is present.

15. The composition in accordance with claim 11 wherein (A) is a vinyldimethylsiloxy endblocked polydimethylsiloxane.

16. The composition in accordance with claim 1 wherein (A) is a vinyldimethylsiloxy endblocked polydimethylsiloxane.

17. The composition in accordance with claim 8 wherein (A) is a vinyldimethylsiloxy endblocked polydimethylsiloxane.

18. An elastomer consisting essentially of the composition of claim 1 cured by a platinum catalyst.

19. An elastomer consisting essentially of the composition of claim 4 cured by a platinum catalyst.

20. An elastomer consisting essentially of the composition of claim 11 cured by a platinum catalyst.

References Cited

UNITED STATES PATENTS 3,532,649  10/1970  Smith et al. _____ 260—18

DONALD E. CZAJA, Primary Examiner

M. I. MARQUIS, Assistant Examiner

U.S. Cl. X.R.

260—46.5 UA, 46.5 H, 46.5 P, 825, 448.2D, 448.2 Q, 448.2 H